US011662012B2

(12) United States Patent
Li et al.

(10) Patent No.: US 11,662,012 B2
(45) Date of Patent: May 30, 2023

(54) WATER COOLING STRUCTURE OF SPEED REDUCER AND SPEED REDUCER ASSEMBLY

(71) Applicant: Jing-Jin Electric Technologies Co., Ltd., Beijing (CN)

(72) Inventors: Jianwen Li, Beijing (CN); Xudong Yang, Beijing (CN); Ping Yu, Beijing (CN); Junwei Yuan, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/638,000

(22) PCT Filed: Oct. 29, 2019

(86) PCT No.: PCT/CN2019/114073
§ 371 (c)(1),
(2) Date: Feb. 24, 2022

(87) PCT Pub. No.: WO2021/042468
PCT Pub. Date: Mar. 11, 2021

(65) Prior Publication Data
US 2022/0316578 A1  Oct. 6, 2022

(30) Foreign Application Priority Data

Sep. 3, 2019 (CN) .......................... 201910827634.7

(51) Int. Cl.
*F16H 57/04* (2010.01)
*F28F 3/12* (2006.01)
(52) U.S. Cl.
CPC ........... *F16H 57/0415* (2013.01); *F28F 3/12* (2013.01)

(58) Field of Classification Search
CPC .................... F16H 57/0415; F28F 3/12; F28F 2009/224; F28F 2009/226; F28F 2009/222;
(Continued)

(56) References Cited

U.S. PATENT DOCUMENTS 3,800,868 A * 4/1974 Berkowitz ............ F28D 9/0031
165/170
2006/0283183 A1 12/2006 Shibata et al.
(Continued)

FOREIGN PATENT DOCUMENTS

CN 202634975 U 12/2012
CN 203500440 U 3/2014
(Continued)

OTHER PUBLICATIONS

International Search Report and Written Opinion for application No. PCT/CN2019/114073, dated May 11, 2020.
(Continued)

*Primary Examiner* — Tho V Duong
(74) *Attorney, Agent, or Firm* — Moser Taboada

(57) ABSTRACT

A water cooling structure of a reducer and a reducer assembly are disclosed. The water cooling structure comprises a chamber formed by a reducer housing and a cover plate, and the cover plate is fixedly connected to the chamber. The chamber is provided with a water inlet and a water outlet respectively. The chamber is also provided with one or several partition plates on two opposite side walls. The partition plates are arranged in an interdigitating manner and each of the partition plates is connected with only one side wall of the chamber, and there is a gap between the partition plates and the opposite other side wall of the chamber, so as to form an S-shaped water path. The water inlet and water outlet are respectively disposed at both ends of the water path. A plurality of baffles are further vertically provided on (Continued)

the partition plates and side walls of the chamber that are parallel to the partition plates, and the baffles are arranged in an interdigitating manner. The water cooling structure disclosed in the present disclosure is integrated with the reducer housing into one part, and thus has a simple structure, saves space and is convenient to arrange on the vehicle. Moreover, the cooling efficiency is further improved by the above special structure.

17 Claims, 3 Drawing Sheets

(58) Field of Classification Search
CPC .......... F28F 1/24; F28F 1/14; F28F 2250/102; F28D 1/0341; F28D 1/0383; F28D 1/05325; F28D 9/0068; F28D 2021/0089
See application file for complete search history.

(56) References Cited

U.S. PATENT DOCUMENTS

| | | | | |
|---|---|---|---|---|
| 2007/0227697 | A1* | 10/2007 | Takahashi | H01L 23/473 257/E23.098 |
| 2014/0110085 | A1* | 4/2014 | Deckers | B21D 53/02 165/80.1 |
| 2015/0116938 | A1* | 4/2015 | Nakanishi | B23P 15/26 165/104.11 |
| 2016/0036104 | A1* | 2/2016 | Kenney | H01M 10/6557 165/170 |

FOREIGN PATENT DOCUMENTS

| | | |
|---|---|---|
| CN | 108627035 A | 10/2018 |
| CN | 209517839 U | 10/2019 |
| CN | 110630731 A | 12/2019 |
| EP | 3124832 A2 | 2/2017 |
| GB | 2414529 A | 11/2005 |
| JP | S511862 A | 1/1976 |
| JP | S5938118 U | 3/1984 |
| JP | 2007002871 A | 1/2007 |
| JP | 2008500497 A | 1/2008 |
| JP | 2010000939 A | 1/2010 |
| JP | 2012237358 A | 12/2012 |
| JP | 2019140276 A | 8/2019 |

OTHER PUBLICATIONS

Supplementary European Search Report for 19944511.5 dated Jul. 19, 2022.

Japanese Office Action for Japanese Patent Application No. 2022-514678 dated Aug. 4, 2022.

* cited by examiner

WATER COOLING STRUCTURE OF SPEED REDUCER AND SPEED REDUCER ASSEMBLY

TECHNICAL FIELD

The present disclosure relates to the field of reducer manufacturing, in particular to a water cooling structure of a reducer and a reducer assembly for reducing the operating temperature of the reducer assembly.

BACKGROUND

The motor adopted by pure electric or hybrid new energy vehicles has a wide speed range and the rotation speed is high. When the reducer assembly operates in the high speed range, loss due to the gear stirring oil is serious and a large amount of heat is generated, resulting in the rapid temperature rise of the reducer assembly. At the same time, the heat generated by the motor during operation is transferred to the reducer assembly through the housing, which further increases the temperature of the reducer assembly.

At present, most reducer assemblies are designed as air cooled, the cooling effect is poor, the heat cannot dissipated in time, and thus the internal temperature of the reducer assembly becomes too high, and the components such as bearings, gears and oil seals run at high temperature for a long time, which is liable to early failure, reduces the design life and reliability of the reducer assembly, and cannot meet the design requirements of new energy vehicles.

SUMMARY

In view of the above problems, the present invention is proposed to solve or at least partially solve the above technical problems.

In order to achieve the above object, the present disclosure adopts the following technical solutions.

An aspect of the present disclosure provides a water cooling structure of a reducer, wherein the water cooling structure comprises a chamber formed by a reducer housing and a cover plate, and the cover plate is fixedly connected to the chamber;

the chamber is provided with a water inlet and a water outlet respectively, the chamber is also provided with one or several partition plates on two opposite side walls, the partition plates are arranged in an interdigitating manner and each of the partition plates is connected with only one side wall of the chamber, and there is a gap between the partition plate and the opposite other side wall of the chamber, so as to form an S-shaped water path, the water inlet and water outlet are respectively disposed at both ends of the water path; and a plurality of baffles are further vertically provided on the partition plates and side walls of the chamber that are parallel to the partition plates, the baffles are arranged in an interdigitating manner, one end thereof is connected with the partition plate or the side wall of the chamber, and there is a gap at other end thereof.

Optionally, a plurality of heat dissipation columns is further provided at a bottom of the chamber.

Optionally, a wavy heat dissipation rib is further provided at a bottom of the chamber.

Optionally, the chamber and the reducer housing are integrally molded or fixedly connected.

Optionally, the cover plate and the chamber are integrally molded or fixedly connected.

Optionally, the partition plates and the chamber are molded or welded together, the baffles and the chamber are molded or welded together, and the partition plates and the baffles are molded or welded together.

Optionally, the heat dissipation columns and the chamber are molded or welded together.

Optionally, the cross section of the heat dissipation column is any of the following shapes: circle, ellipse and polygon.

Optionally, the chamber is disposed at the bottom of the reducer housing and/or on both side walls of the reducer housing.

Another aspect of the present disclosure provides a reducer assembly comprising a water cooling structure as stated above.

The present disclosure has the following advantages:

The water cooling structure according to the present disclosure is integrated with the reducer housing into one part, and thus has a simple structure, saves space and is convenient to arrange on the vehicle. Moreover, the number of parts is reduced, the reducer assembly becomes less complicated, simple and reliable.

In the present disclosure, projecting heat dissipation columns and wavy heat dissipation ribs are provided at the bottom of the water path. The cooling fluid flows in from the water inlet, passes through the multi-stage heat dissipation columns and baffles, and fully exchanges heat through the surface of the heat dissipation columns. Moreover, the wavy heat dissipation ribs increase the heat dissipation contact area, further improve the cooling efficiency and meet the requirements of high-speed working conditions of the vehicle.

The above is only an overview of the technical solutions of the present disclosure. In order to better understand the technical means of the present disclosure so that it can be implemented according to the contents of the description, and in order to make the above and other objects, features and advantages of the present disclosure more obvious and easy to understand, the specific embodiments of the present disclosure are given below.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, like reference numerals denote like components. In the drawings.

Figure 1:
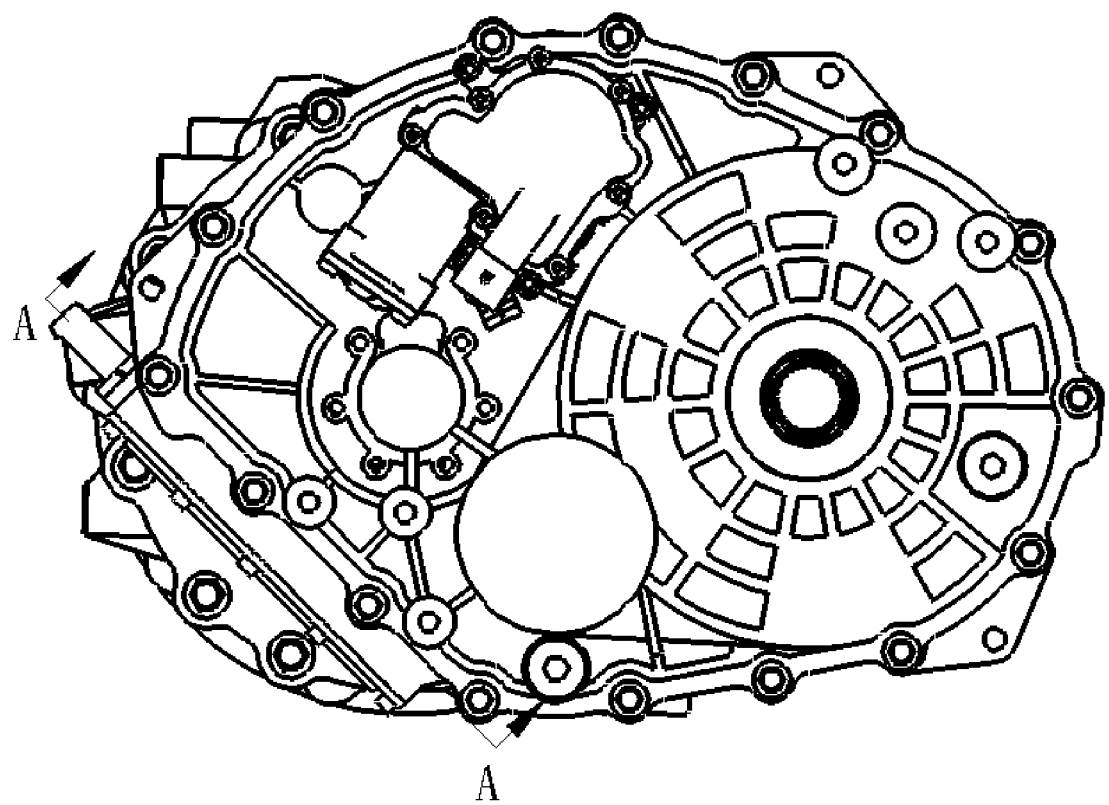
FIG. 1 is a schematic diagram of a water cooling structure of a reducer disposed at a side of a reducer assembly in an embodiment of the present disclosure.
Figure 2:
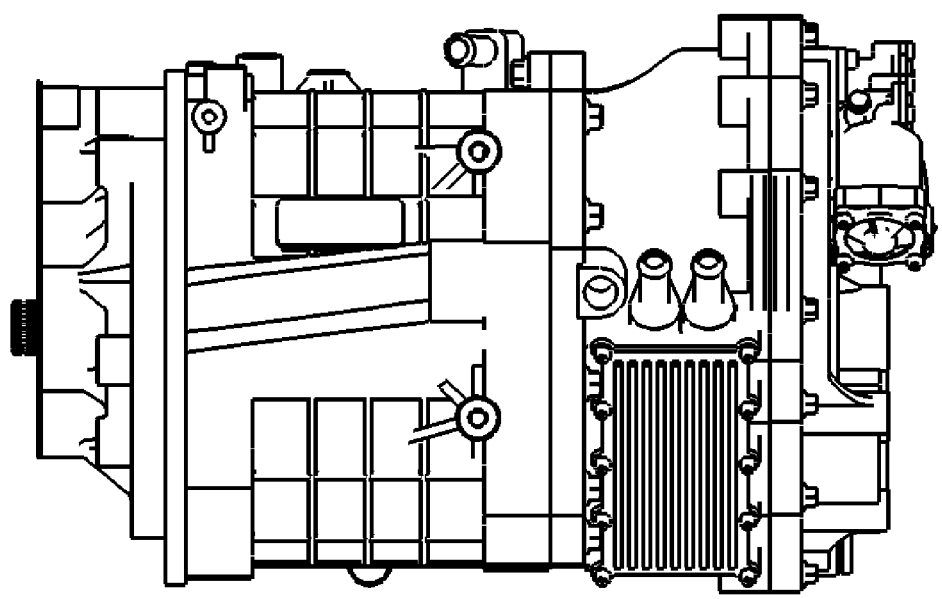
FIG. 2 is a left view of FIG. 1.

In the drawings: 1. water inlet; 2. water outlet; 3. heat dissipation column; 4. baffle; 5. wavy rib; 6. partition plate.

DETAILED DESCRIPTION

Illustrative embodiments of the present disclosure will be described in more detail with reference to the drawings.

Although the drawings show the illustrative embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

The "and/or" herein means that both the situation that each item exists separately and the situation that the items coexist are included.

The "inside" and "outside" herein are defined relative to the equipment itself. The direction pointing to the inside of the equipment is "inside", and the direction pointing to the outside of the equipment is "outside".

Figure 3:
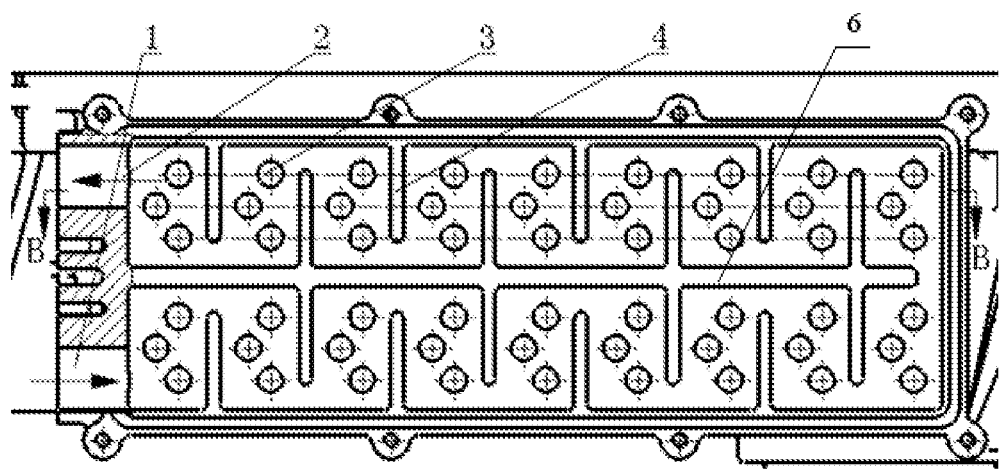
FIG. 3 is a sectional view along A-A line in FIG. 1.
Figure 4:
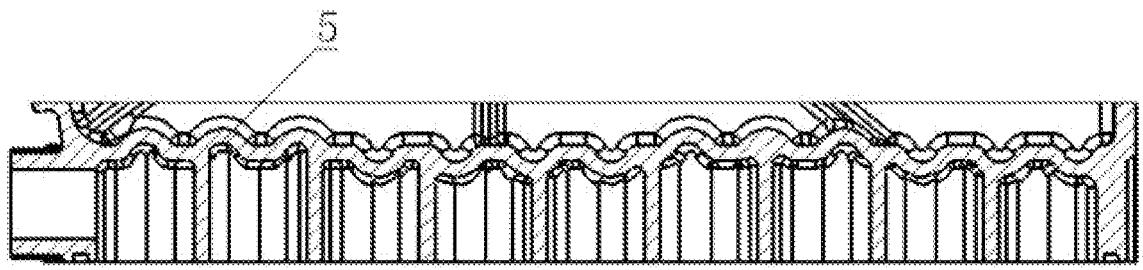
FIG. 4 is a sectional view along B-B line in FIG. 3.
Figure 5:
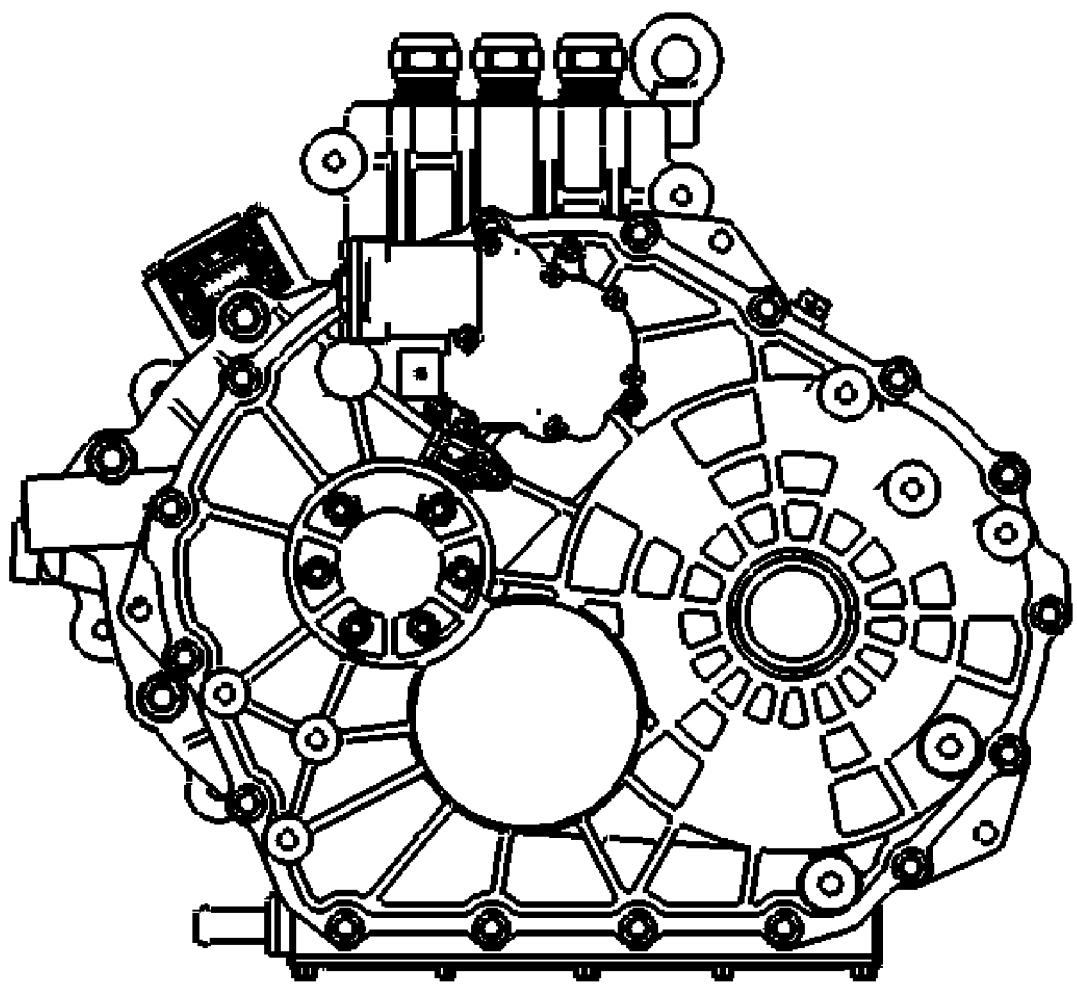
FIG. 5 is a schematic diagram of a water cooling structure of a reducer disposed at a bottom of a reducer assembly in another embodiment of the present disclosure.

Referring to FIGS. 3-4, the water cooling structure of an embodiment of the present disclosure comprises a chamber formed by the reducer housing and a cover plate, and the cover plate is fixedly connected to the chamber. The chamber is provided with a water inlet 1 and a water outlet 2 respectively. The chamber is also provided with one or several partition plates 6 on two opposite side walls. The partition plates 6 are arranged in an interdigitating manner and each of the partition plates 6 is connected with only one side wall of the chamber, and there is a gap between the partition plate 6 and the opposite other side wall of the chamber, so as to form an S-shaped water path. The water inlet 1 and water outlet 2 are respectively disposed at both ends of the water path.

Moreover, a plurality of baffles 4 are vertically provided on the partition plates 6 and the side walls of the chamber that are parallel to the partition plates 6. The baffles 4 are arranged in an interdigitating manner, one end thereof is connected with the partition plate or the side wall of the chamber, and there is a gap at other end thereof.

FIG. 3 shows that there is one partition plate 6. However, the number of partition plates in the present disclosure is not limited to one. When the number of partition plates is odd, the water outlet and water inlet are provided on the same side of the chamber, which is convenient for installation and saves space. Further, the baffles 4 in FIG. 3 are arranged vertically and symmetrically, and the baffles 4 may also be distributed in an irregular manner.

In the embodiment of the present disclosure, through the design of the partition plate and baffle, the cooling water sufficiently flows in the water cooling chamber, exchanges heat with the partition plate and baffle, and improves the cooling efficiency.

In a preferred embodiment, a plurality of heat dissipation columns 3 is further provided at a bottom of the chamber. The heat dissipation columns 3 may be arranged at the bottom of the chamber regularly or in groups, or irregularly distributed, so as to realize the purpose of cooling the lubricating oil on the other side of the bottom of the chamber at multiple stages and levels.

Preferably, the bottom of the chamber is further provided with wavy heat dissipation ribs 5. The heat dissipation ribs 5 may be provided in multiple groups or one group to increase the heat dissipation contact area. The lubricating oil flows inside the wavy heat dissipation ribs 5, the cooling water flows outside the wavy heat dissipation ribs 5, and the heat transferred by the lubricating oil of the reducer assembly is taken away.

In an embodiment, the chamber and the reducer housing are integrally molded or fixedly connected. The cover plate and the chamber are integrally molded or fixedly connected. The fixed connection may be welding, bolt connection and other forms, which are not specifically limited herein.

In an embodiment, the partition plates and the chamber are molded or welded together, the baffles and the chamber are molded or welded together, and the partition plates and the baffles are molded or welded together; moreover, the heat dissipation columns and the chamber are molded or welded together. Through integrated molding or welding, the connection strength between the partition plates and the baffles and between the heat dissipation columns and the bottom of the chamber is ensured, and the manufacturing process is simplified.

In an embodiment, the cross section of the heat dissipation column is any of the following shapes: circle, ellipse and polygon, among which the polygon may be triangular, quadrilateral such as rhombus, or polygon with more than five sides, so as to achieve better heat dissipation effect.

Preferably, the chamber is disposed at the bottom of the reducer housing and/or on both side walls of the reducer housing. Of course, the water cooling structure may be disposed at any position on the reducer housing as required.

The water cooling structure disclosed in the present disclosure is integrated with the reducer housing into one part, and thus has a simple structure and saves space; moreover, the projecting heat dissipation columns 3 and wavy heat dissipation ribs 5 are provided at the bottom of the water path, thereby further improving the cooling efficiency.

The working flow of the water cooling structure of the present disclosure is as follows. The cooling fluid flows in from the water inlet 1, passes through the multi-stage heat dissipation columns 3 and baffles 4, and sufficiently exchanges heat by the surface of the heat dissipation columns 3. The wavy heat dissipation ribs 5 increase the heat dissipation contact area. The lubricating oil flows inside the wavy ribs 5, the cooling fluid flows outside the wavy ribs 5, the heat transferred from the lubricating oil of the reducer assembly is taken away, the cooling fluid turns back after reaching the bottom of the cooler, and then flows through the multi-stage cooling columns 3 and baffles 4 again, and finally flows out through the water outlet 2, thereby completing a cooling cycle.

Another aspect of the present disclosure provides a reducer assembly, which comprises the water cooling structure of a reducer as stated above.

The above are only the specific embodiments of the present disclosure, but the protection scope of the present disclosure is not limited to this. Any person skilled in the art can easily think of changes or substitutions within the technical scope disclosed by the present disclosure, which should be covered by the protection scope of the present disclosure. Therefore, the protection scope of the present disclosure shall be subject to the protection scope of the claims.

What is claimed is:

1. A water cooling structure of a reducer, the water cooling structure comprising:
   a chamber formed by a reducer housing and a cover plate, wherein the cover plate is fixedly connected to the chamber,
   wherein the chamber has a water inlet and a water outlet respectively, one or several partition plates on two opposite side walls, and a wavy heat dissipation rib at a bottom of the chamber,
   wherein the partition plates are arranged in an interdigitating manner and each of the partition plates is connected with only one side wall of the chamber, and there is a gap between the partition plate and the opposite other side wall of the chamber, so as to form an S-shaped water path, wherein the water inlet and water outlet are respectively disposed at both ends of the water path, and wherein a plurality of baffles are further vertically provided on the partition plates and side walls of the chamber that are parallel to the partition plates, wherein the baffles are arranged in an interdigitating manner, one end thereof is connected with the partition plate or the side wall of the chamber, and there is a gap at other end thereof; and wherein the wavy heat dissipation rib bends up and down and has an internal passage configured to permit a flow of lubricating oil of the reducer inside the wavy heat dissipation rib, wherein when lubricating oil flows inside the wavy heat dissipation rib and cooling water flows outside the wavy heat dissipation rib, heat transferred by the lubricating oil is transferred to the cooling water.

2. The water cooling structure according to claim 1, wherein a heat dissipation column is further provided at a bottom of the chamber.

3. The water cooling structure according to claim 1, wherein the chamber and the reducer housing are integrally molded or fixedly connected.

4. The water cooling structure according to claim 1, wherein the cover plate and the chamber are integrally molded or fixedly connected.

5. The water cooling structure according to claim 1, wherein the partition plates and the chamber are molded or welded together, the baffles and the chamber are molded or welded together, and the partition plates and the baffles are molded or welded together.

6. The water cooling structure according to claim 2, wherein the heat dissipation column and the chamber are molded or welded together.

7. The water cooling structure according to claim 2, wherein the cross section of the heat dissipation column is any of the following shapes:

circle, ellipse and polygon.

8. The water cooling structure according to claim 1, wherein the chamber is disposed at a bottom of the reducer housing and/or on both side walls of the reducer housing.

9. A reducer assembly, comprising a water cooling structure according to claim 1.

10. The water cooling structure according to claim 6, wherein the cross section of the heat dissipation column is any of the following shapes: circle, ellipse and polygon.

11. A reducer assembly, comprising a water cooling structure according to claim 2.

12. A reducer assembly, comprising a water cooling structure according to claim 3.

13. A reducer assembly, comprising a water cooling structure according to claim 4.

14. A reducer assembly, comprising a water cooling structure according to claim 5.

15. A reducer assembly, comprising a water cooling structure according to claim 6.

16. A reducer assembly, comprising a water cooling structure according to claim 7.

17. A reducer assembly, comprising a water cooling structure according to claim 8.

* * * * *